United States Patent Office 3,279,906
Patented Oct. 18, 1966

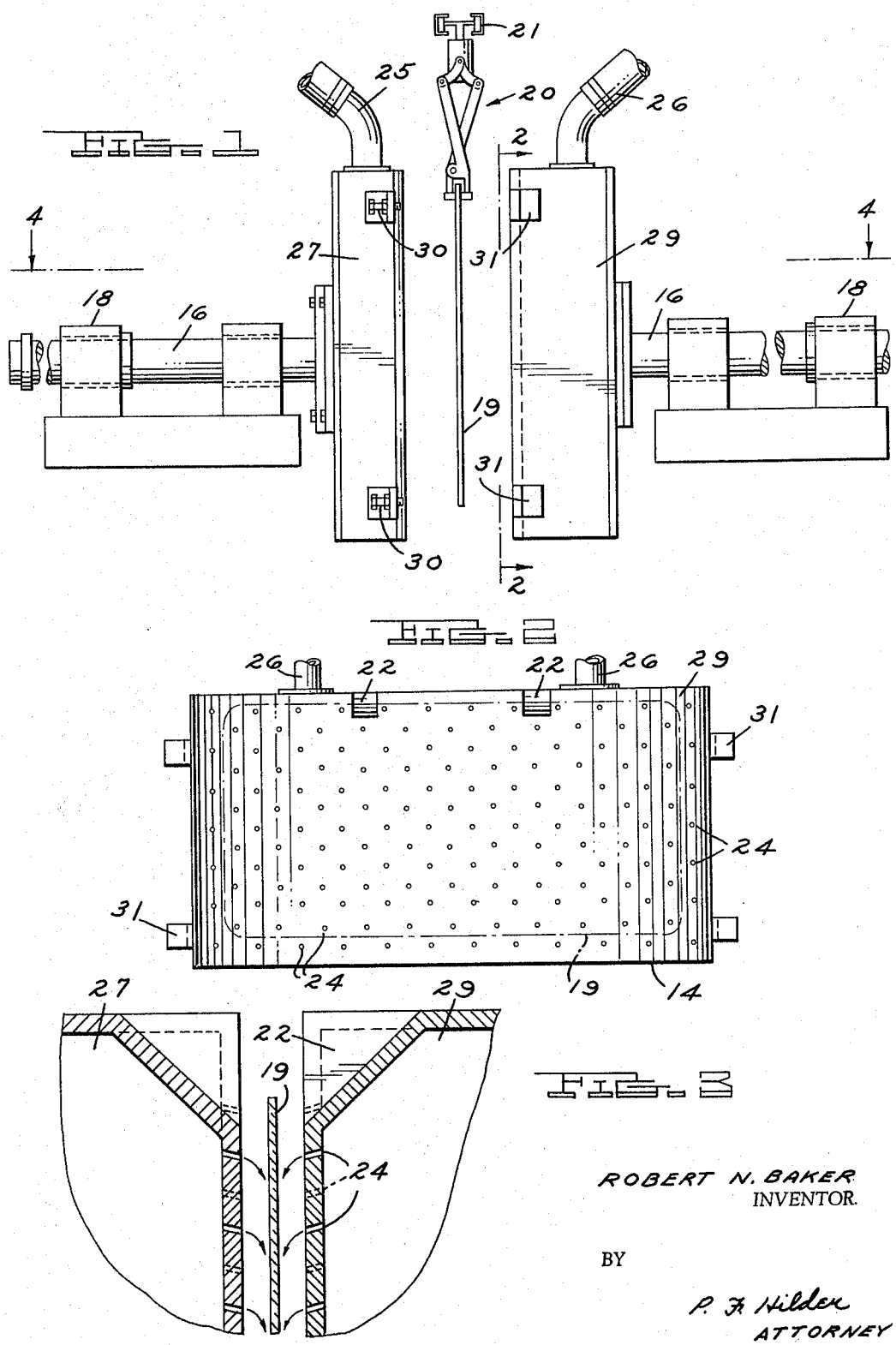

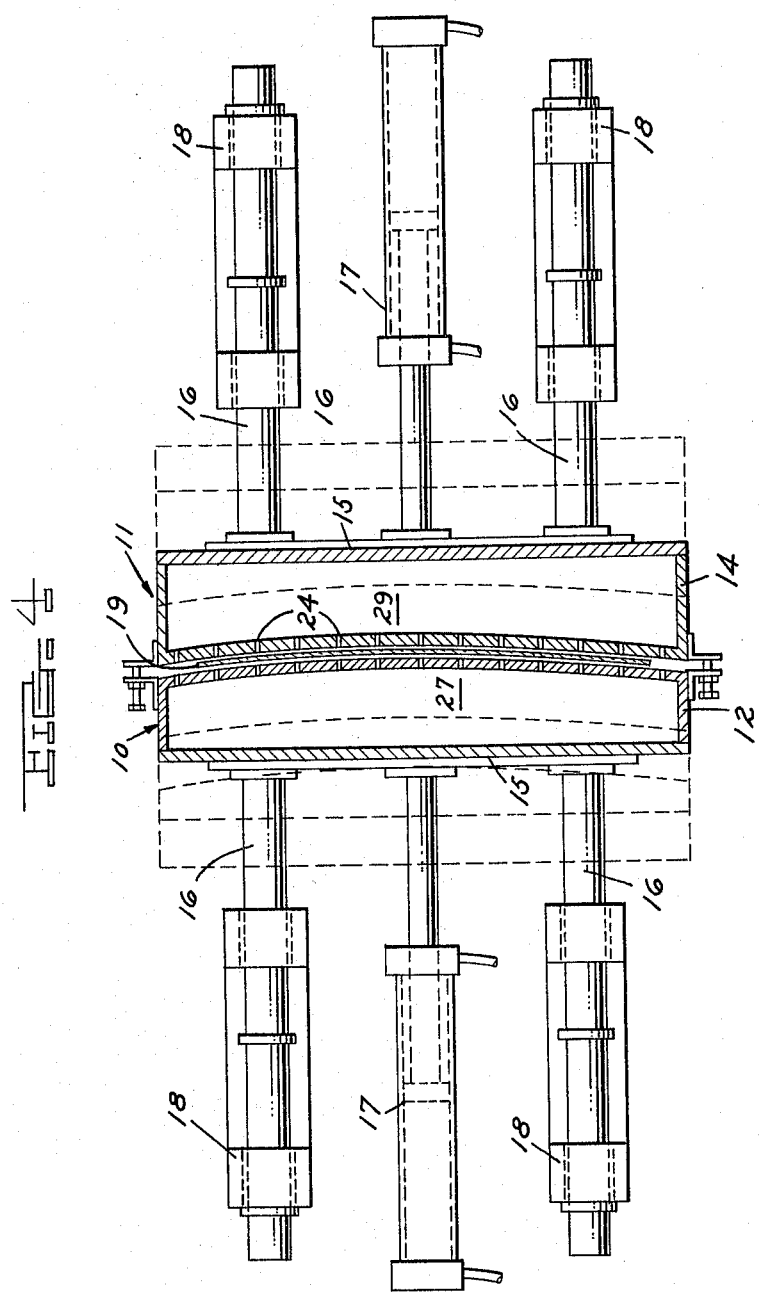

3,279,906
APPARATUS FOR PRESS FORMING AND TEMPERING OF GLASS
Robert N. Baker, Dearborn, Mich., assignor to Ford Motor Company, Dearborn, Mich., a corporation of Delaware
Filed Feb. 27, 1963, Ser. No. 261,281
2 Claims. (Cl. 65—268)

This invention relates to a method and machine for the press-forming and tempering of glass sheets. The invention also has application in the tempering of glass that has not been press-formed.

Sheets of glass may be heated to softening temperature (about 1330° F.) and then press-formed to the desired shape between a pair of forming dies. Preferably, this operation is performed while the glass is vertically suspended by two or more pairs of glass tongs engaged with the upper edge portion of the glass. The forming operation can be carried out without marring the surface of the glass except for small tong marks formed by the points of the tongs.

After forming and while still sufficiently hot, the glass may be tempered by directing quantities of air on both faces of the glass to case harden the glass and make it more resistant to breakage. The tempering is accomplished while the glass still is suspended from the tongs which have supported it during the heating and forming steps.

According to the present invention, the glass is both formed and tempered at the same location by an improved type of forming dies in which the matrix surfaces are faced with a smooth material of low heat conductivity. A series of small holes in the matrix surfaces of the dies provide for tempering the glass immediately after forming and without the necessity of reindexing the glass or removing the forming dies and bringing in the quench heads. The holes are so formed as to prevent excessive swaying movement of the glass under the influence of the air blast.

Among the objects of the present invention are to provide an improved method and apparatus for press-forming and tempering glass in which the glass is formed without marking from the matrix surfaces of the dies and in which a uniform quenching is obtained without excessive movement of the glass when subjected to the air blasts; and to improve methods and apparatus for the tempering of glass.

Other objects and objects relating to details of manufacture and use will be more apparent from the detailed description to follow.

My invention is clearly defined in the appended claims.

In the claims, as well as in the description, parts may at times be identified by specific names for clarity and convenience, but such nomenclature, is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a schematic side elevation of a press-forming and tempering machine according to the present invention. A sheet of glass is shown supported in position between the dies by tongs for press-forming and tempering.

FIGURE 2 is an elevation of one of the press forming molds.

FIGURE 3 is an enlarged fragmentary vertical section through a pair of dies and the glass, indicating the direction of air currents during tempering.

FIGURE 4 is a horizontal section taken through the dies when in substantially closed position and indicating the press-forming of a piece of glass therebetween.

Referring to the drawings, the machine of the present invention includes a male and female press-forming die 10 and 11 respectively. The dies 10 and 11 may be formed of resin-impregnated glass fiber bodies 12 and 14 respectively in the form of boxes, each having an open rear wall. The rear wall of each box is closed by a metal plate 15 to which are attached telescoping guides 16 received in sleeves 18. Pneumatic rams 17 are provided for pressing the dies together and for retracting the dies for quenching and for removing the bent and tempered glass.

The matrix surfaces of the dies 10 and 11 preferably are faced with very smooth material having a low coefficient of heat transfer. The material may be Hydrostone, a smooth, refractory gypsum cement, or Glass Rock formed of 99% fused silica plus a heat resistant binder. These surfaces are given the curvature desired for the glass. The curvature shown in the drawings is generally cylindrical.

A sheet of glass 19 to be tempered is supported by at least two glass tongs, one tong 20 being shown, which are mounted for movement along a horizontally extending track 21 leading from a furnace (not shown) adapted to heat the glass to its softening temperature before it is positioned between the dies for forming and tempering. The matrix surfaces of the dies 10 and 11 are provided with notches 22 to provide clearance for the tongs upon closing the dies so that the dies will not touch the tongs.

The matrix surfaces of the dies 10 and 11 are provided with a multiplicity of holes 24 which extend into an air chamber 27 or 29 within each die. The holes 24 are arranged in a uniform pattern along the entire matrix surface of each die. Flexible air conduits 25 and 26 introduce air into the air chambers 27 and 29 within the dies 10 and 11 so as to produce air pressure within the chambers.

The holes 24 formed in the matrix surfaces of the dies preferably are round holes of between one sixteenth and one eighth inch in diameter. It has been found that holes of such diameter will not mark the glass during the press-forming operation and will permit satisfactory tempering of the glass using a pressure within the air chambers of the dies of about nine lbs. per square inch. The holes may be spaced in staggered rows and columns about 1¼ inches apart to obtain good distribution of air over the surface of the glass 19 to be quenched. If it is not desired to quench the entire surface of the glass, the holes may be omitted where quenching is not desired.

The majority, and preferably all of the holes 24 are inclined downwardly from the horizontal at an angle of up to 45°, preferably being inclined downwardly at about 10°. This downward inclination of the holes 24 provides a downward flow of air along the faces of glass to pass the spent air principally off of the bottom of the glass, and forms a downward component of pull against the glass which is supported along its top edge by the tongs 20. It has been found that by inclining the holes 24 and air jets, downwardly, swinging of the glass 19 during quenching can be limited, the glass tending to hang relatively stationary midway between the two dies. Preferably, the holes 24 are located in the matrix surfaces of the dies so as to impinge the jets of air on the opposite faces of the glass with each jet of one die impinging on the glass directly opposite the corresponding jet of the other die, as indicated in FIGURE 3.

Preferably, the dies 10 and 11 are moved during quenching to distribute the quench air more or less evenly over the faces of the glass. The dies may either be reciprocated or moved in an orbital or circular motion. It has been found that a satisfactory quench has been obtained by oscillating the dies along the path of a 4 inch diameter circle lying in a vertical plane. Such a movement of quenching dies is conventional and preferably accomplished by mounting the dies on cranks of a 2 inch radius.

In practising the present invention, a sheet of glass is first heated to softening temperature while vertically suspended by two or more tongs 20 supported from the track 21. The dies 10 and 11 are mounted close to the furnace and initially are open to receive glass.

The glass 19, supported by the tongs, is moved between the dies and the dies quickly closed by means of the pneumatic rams 17. Closing movement of the dies is limited by the adjustable stop screws 30 mounted on the die 10 and confronting angles 31 mounted on the die 11. These screws are adjusted so that the dies will close on the glass substantially completely so as to shape the glass to the curvature of the dies, but will not exert pressure on the glass so as to mark the faces thereof. It has been found that by using dies of the type described, the glass can be shaped without marking the surface of the glass.

The tongs 20 are received within the notches 22 along the top edge of the dies. The tongs are capable of universal movement so as not to restrain the glass, but merely to support it during the pressing operation.

After press-forming, the dies are withdrawn a short distance, e.g. 3 to 4 inches, from the glass for quenching. During the quenching, preferably the glass is held stationary and the dies are oscillated as above described. Following quenching, the dies are opened wider to permit the curved glass to be removed by movement of the tongs along the track 21.

Angling of the jets of air downwardly has been found to eliminate or greatly reduce flutter of the glass during quenching and to permit the matrix surfaces of the dies to be closer to the glass during quenching so as to obtain a better, quicker quench. Also, directing the jets of air downwardly away from the tongs permits one of the dies to be closer to the glass than the other during quenching and permits a differential in air pressure for quenching in order to better control glass warpage or "spring back" after quenching.

The downwardly angled jet construction may also be applied to quenching heads for flat, vertically suspended sheets of glass that have not been press-formed. When applied to such quenching heads, the same advantages set forth above are obtained.

If desired, two or more pairs of press-forming dies can be arranged side-by-side to process two pieces of glass simultaneously.

I claim:

1. In apparatus for the press-forming and tempering of a sheet of glass suspended in a vertical plane by glass tongs engaged with the top portion of the sheet, a pair of forming dies having confronting matrix surfaces of low thermal conductivity, a series of orifices in the matrix surfaces of said dies, means for pressing said dies together to press-form an interposed sheet of glass and subsequently separating the dies, and means for directing streams of gas through the orifices and against the faces of the glass, at least the majority of the orifices being directed downwardly at an angle of about 10° to cause the body of spent air to move downwardly.

2. In apparatus for the press-forming and tempering of a sheet of glass suspended vertically by glass tongs engaged with the top portion of the sheet, a pair of forming dies having confronting matrix surfaces faced with smooth material of low thermal conductivity, a series of orifices in the matrix surfaces of said dies, means for pressing said dies together to press-form an interposed sheet of glass and for subsequently separating the dies, and means for directing streams of gas through the orifices and against the faces of the glass, the majority of the orifices being directed downwardly to cause the body of spent air to move downwardly.

References Cited by the Examiner

UNITED STATES PATENTS

| 2,560,599 | 7/1951 | Ryan | 65—287 |
| 2,677,918 | 5/1954 | Bird et al. | 65—268 |

FOREIGN PATENTS

| 1,059,296 | 11/1953 | France. |
| 773,469 | 4/1957 | Great Britain. |

DONALL H. SYLVESTER, *Primary Examiner.*

A. D. KELLOGG, *Assistant Examiner.*